US009333840B1

(12) United States Patent
Pino

(10) Patent No.: US 9,333,840 B1
(45) Date of Patent: May 10, 2016

(54) GOLF CART RAIN COVER

(71) Applicant: Peter Pino, Parkland, FL (US)

(72) Inventor: Peter Pino, Parkland, FL (US)

( * ) Notice: Subject to any disclaimer, the term of this patent is extended or adjusted under 35 U.S.C. 154(b) by 0 days.

(21) Appl. No.: 14/480,743

(22) Filed: Sep. 9, 2014

(51) Int. Cl.
*B60J 1/00* (2006.01)
*B60J 7/10* (2006.01)
B62D 25/04 (2006.01)
B60J 5/04 (2006.01)
B62D 31/00 (2006.01)

(52) U.S. Cl.
CPC ... *B60J 7/104* (2013.01); *B60J 5/04* (2013.01); *B62D 25/04* (2013.01); *B62D 31/00* (2013.01)

(58) Field of Classification Search
CPC ............ B60J 7/104; B60J 5/04; B62D 31/00; B62D 25/04
USPC .................. 296/145, 79, 83, 96.21, 102, 148, 296/136.07, 136.1
See application file for complete search history.

(56) References Cited

U.S. PATENT DOCUMENTS

| 4,013,315 | A | 3/1977 | West |
| 4,098,536 | A | 7/1978 | Mills |
| 4,773,694 | A | 9/1988 | Gerber |
| 5,217,275 | A | 6/1993 | Ridge |
| 5,310,235 | A * | 5/1994 | Seymour ................... B60J 7/104 280/DIG. 5 |
| 5,588,690 | A * | 12/1996 | Showalter ................ B60J 11/00 135/88.09 |
| 5,788,317 | A | 8/1998 | Nation |
| 6,916,059 | B2 | 7/2005 | Feinberg |
| 6,926,334 | B1 * | 8/2005 | Diehm ....................... B60J 1/00 160/328 |
| 7,354,092 | B2 | 4/2008 | Showalter et al. |
| 7,448,666 | B2 | 11/2008 | Tyrer |
| 7,740,300 | B2 | 6/2010 | Marsh |
| 2013/0200647 | A1 | 8/2013 | Markley |

FOREIGN PATENT DOCUMENTS

JP      3059697      7/2000

* cited by examiner

*Primary Examiner* — Joseph D Pape
*Assistant Examiner* — Dana Ivey
(74) *Attorney, Agent, or Firm* — Kyle A. Fletcher, Esq.

(57) ABSTRACT

The removable cab assembly includes a cover that is positionable on a golf cart. The cover encloses a pair of seats on the golf cart. A plurality of straps is coupled to the cover. Each of the plurality of straps is tied to the golf cart. The cover is retained on the golf cart.

11 Claims, 4 Drawing Sheets

GOLF CART RAIN COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of rain covers, more specifically, golf cart rain covers.

SUMMARY OF THE INVENTION

An embodiment of the disclosure meets the needs presented above by generally comprising a cover that is positionable on a golf cart. The cover encloses a pair of seats on the golf cart. A plurality of straps is coupled to the cover. Each of the plurality of straps is tied to the golf cart. The cover is retained on the golf cart.

An object of the invention is to provide a device that is golf cart rain cover.

These together with additional objects, features and advantages of the golf cart rain cover will be readily apparent to those of ordinary skill in the art upon reading the following illustrative, embodiments of the golf cart rain cover when taken in conjunction with the accompanying drawings.

In this respect, before explaining the current embodiments of the golf cart rain cover in detail, it is to be understood that the golf cart rain cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the golf cart rain cover.

It is therefore important that the claims be regarded as including such equivalent construction insofar as they do not depart from the spirit and scope of the golf cart rain cover. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
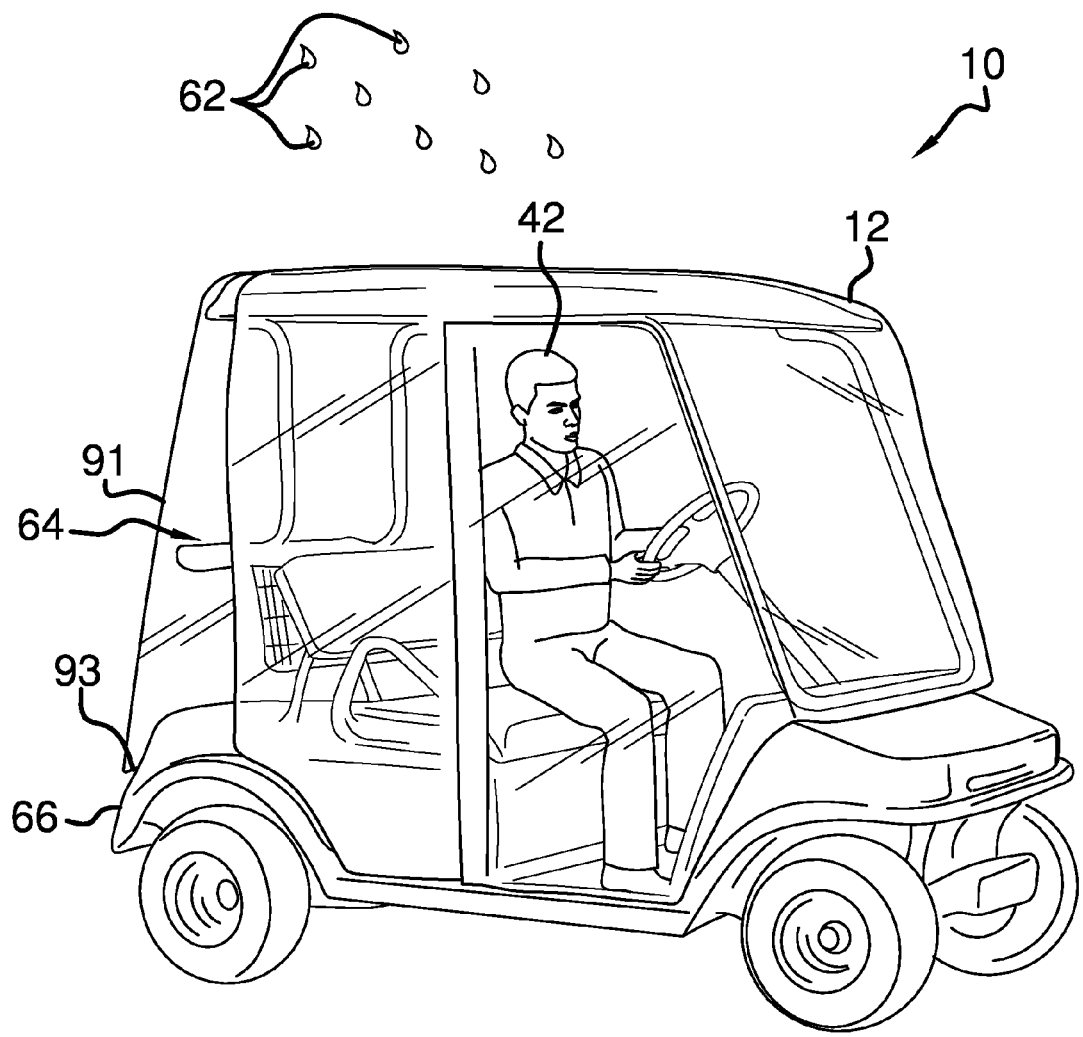
FIG. 1 is an in-use view of a removable cab assembly according to an embodiment of the disclosure.
Figure 2:
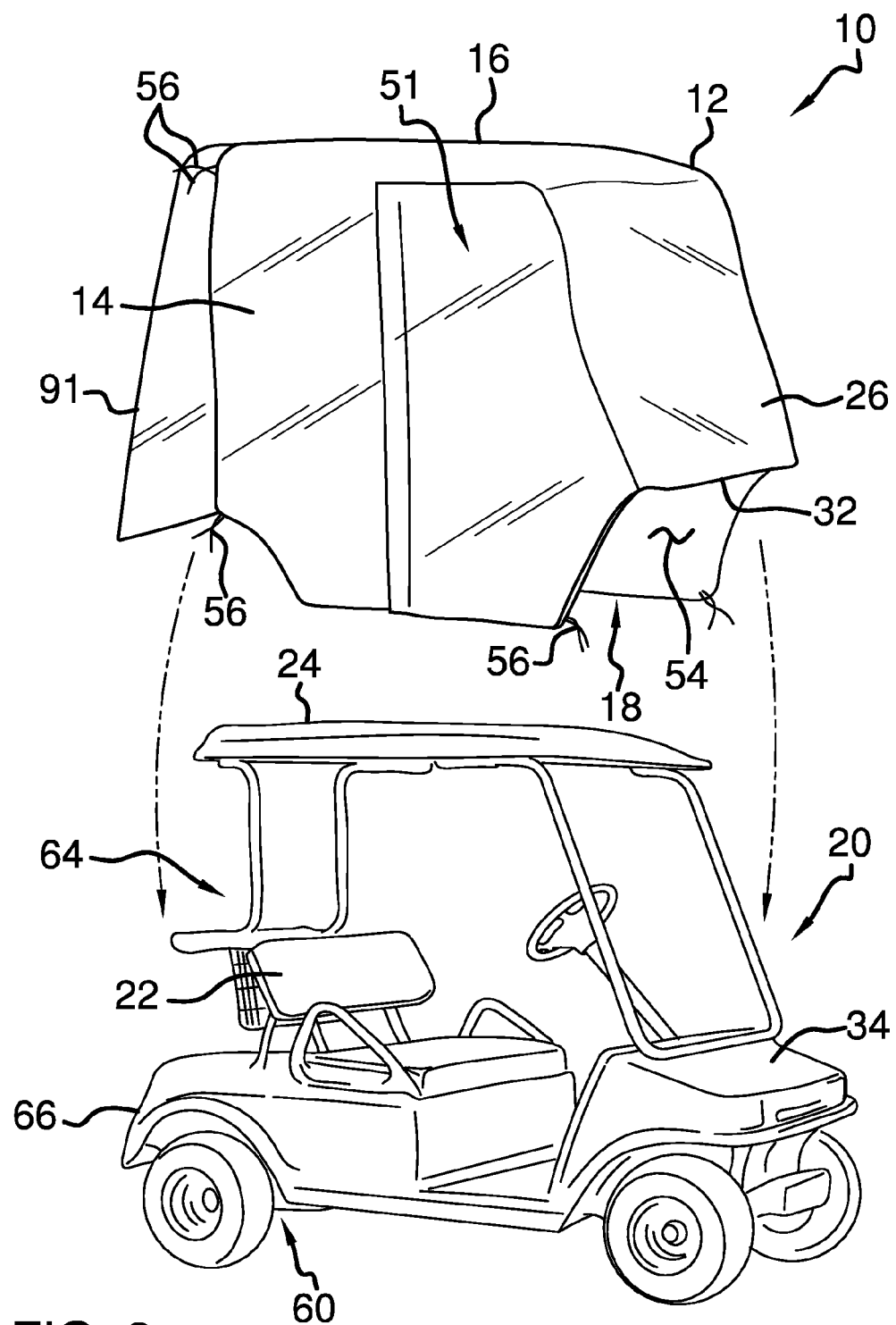
FIG. 2 is a perspective view of an embodiment of the disclosure.
Figure 3:
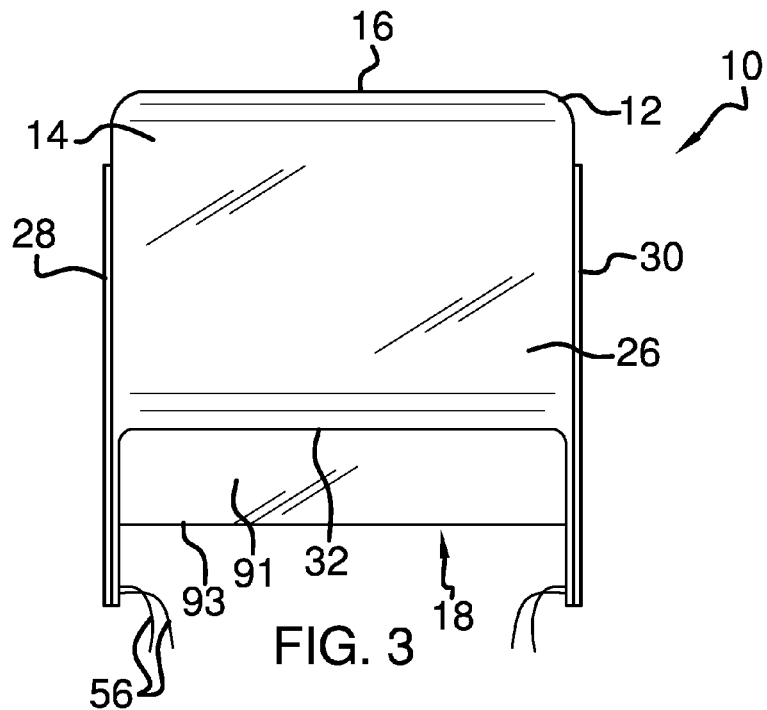
FIG. 3 is a front view of an embodiment of the disclosure.
Figure 4:
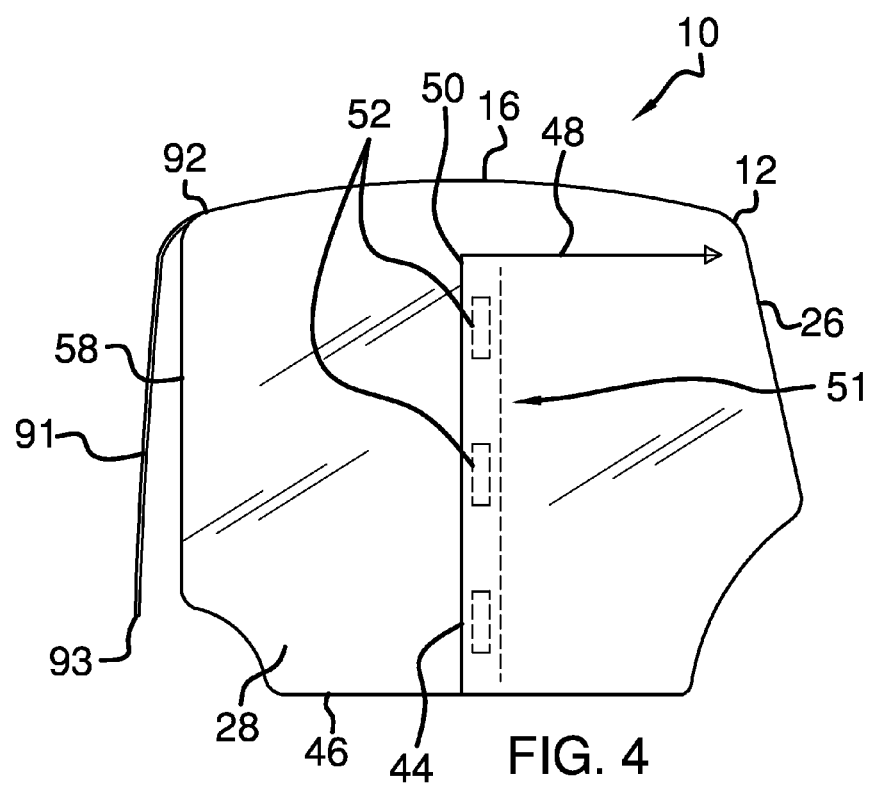
FIG. 4 is a right side view of an embodiment of the disclosure.
Figure 5:
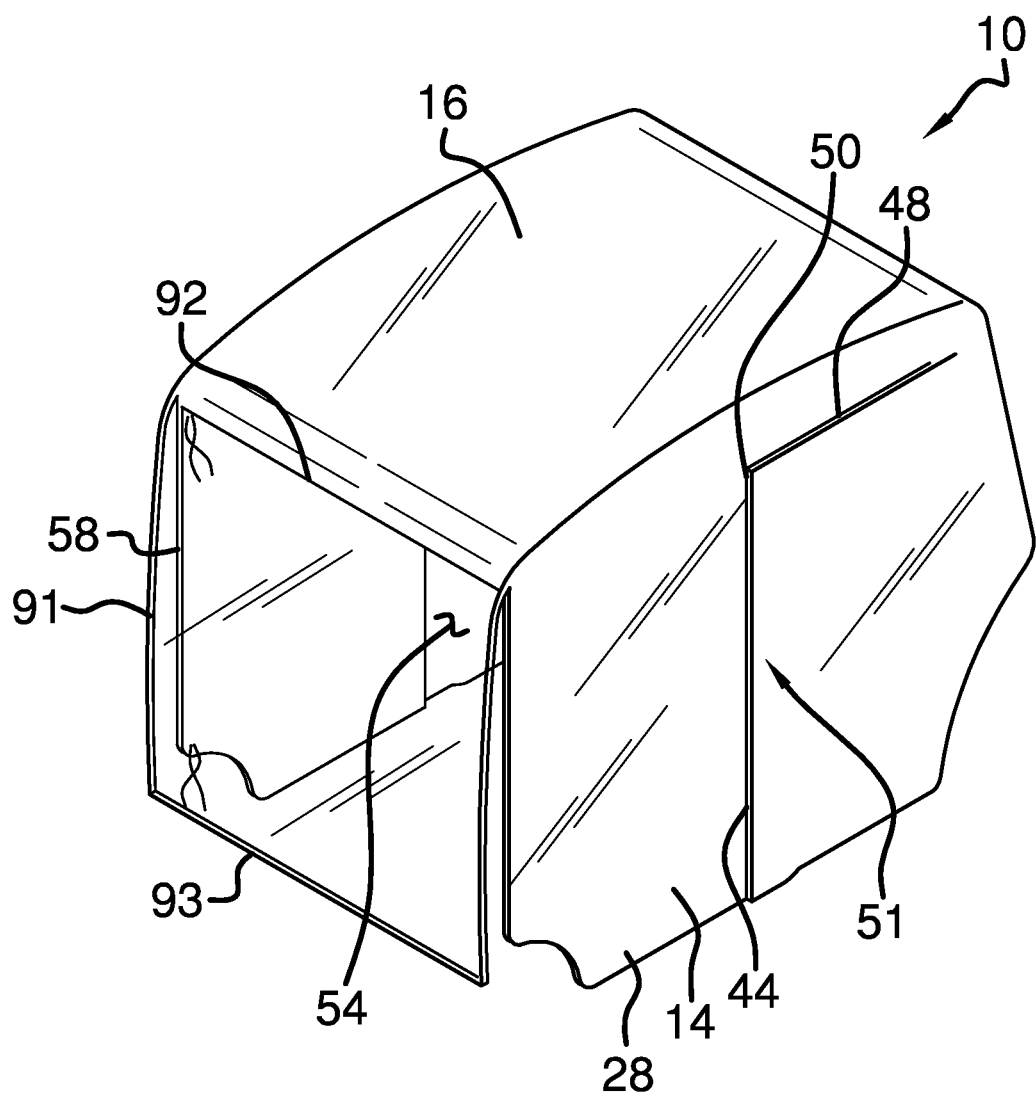
FIG. 5 is a back perspective view of an embodiment of the disclosure.

As best illustrated in FIGS. 1 through 5, the removable cab assembly 10 generally comprises a cover 12. The cover 12 has an outer wall 14 extending downwardly from a top wall 16 of the cover 12. A bottom 18 of the cover 12 is open. Moreover, the bottom 18 of the cover 12 insertably receives a golf cart 20. A user 42 is able to see thru the cover 12.

The cover 12 is positionable on the golf cart 20 so the cover 12 encloses a pair of seats 22 on the golf cart 20. The top wall 16 of the cover 12 abuts a roof 24 on the golf cart 20 when the cover 12 is positioned over the golf cart 20. The golf cart 20 may be of any conventional design. Finally, the cover 12 may be comprised of a deformable and fluid impermeable material.

A front side 26 of the outer wall 14 of the cover 12 has a height that is less than a height of each of a first 28 and a second 30 lateral side of the cover 12. A lower edge 32 of the front side 26 of the outer wall 14 of the cover 12 abuts a hood 34 of the golf cart 20 when the cover 12 is positioned over the golf cart 20.

Each of the first 28 and second 30 lateral sides of the outer wall 14 of the cover 12 has a first cut 44 extending upwardly from a bottom edge 46 of each of the first 28 and second 30 lateral sides of the outer wall 14 of the cover 12. The first cut 44 is centrally positioned on each of the first 28 and second 30 lateral sides of the outer wall 14 of the cover 12. Moreover, the first 28 and second 30 lateral sides of the cover 12 each has a second cut 48 extending forwardly from a top end 50 of the first cut 44. The first 44 and second 48 cuts forms a door 51 on each of the first 28 and second 30 lateral sides of the outer wall 14 of the cover 12.

The first cut 44 on each of the first 28 and second 30 lateral sides of the outer wall 14 of the cover 12 overlaps the first 28 and second 30 lateral sides of the outer wall 14 of the cover 12. A plurality of couplers 52 is coupled to an inside surface 54 of the first 28 and second 30 lateral sides of the outer wall 14 of the cover 12. The plurality of couplers 52 are positioned proximate the first cut 44 on an associated one of the first 28 and second 30 lateral sides of the outer wall 14 of the cover 12. Each of the plurality of couplers 52 engages the first 28 and second 30 lateral sides of the outer wall 14 of the cover 12. The door 51 on each of the first 28 and second 30 lateral sides of the outer wall 14 of the cover 12 is retained in a closed position. The plurality of couplers 52 may each comprise a hook and loop fastener of any conventional design.

A plurality of straps 56 is each positioned at an intersection of the front side 26 and each of the first 28 and second 30 lateral sides of the outer wall 14 of the cover 12. The plurality of straps 56 is additionally positioned at an intersection of a back edge 58 and each of the first 28 and second 30 lateral sides of the outer wall 14 of the cover 12. Each of the plurality of straps 56 is tied to a bottom 60 of the golf cart 20. The cover 12 is positionable over the golf cart 20 when the golf cart 20 is exposed to precipitation 62 so the user 42 is protected from the precipitation. The back edge 58 of the outer wall 14 of the cover 12 is open.

The cover 12 includes a back member 91 that extends downwardly from a top, rear edge 92 of the top wall 16. The back member 91 is adapted to rest against a club storage area 64 on a back 66 of the golf cart 20. The back member 91 hangs freely from the top, rear edge 92 of the top wall 16 so as to provide access to the club storage area 64. The back member 91 extends downwardly from the top, rear edge 92 to a back, bottom edge 93, which surpasses the club storage area 64 of the back 66 of the golf cart 20.

In use, the cover 12 is positioned over the golf cart 20 when the golf cart 20 is exposed to the precipitation 62. The user 42 enters and exits the golf cart 20 through a selected one of the doors 50.

With respect to the above description, it is to be realized that the optimum dimensional relationship for the various components of the removable cab assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the removable cab assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A removable cab assembly configured to be positioned on a golf cart comprising:
   a cover configured to be positioned on the golf cart such that said cover encloses a pair of seats on the golf cart;
   wherein the cover is positionable over the golf cart when the golf cart is exposed to precipitation so a user is protected from the precipitation;
   a plurality of straps coupled to said cover;
   wherein the cover has an outer wall extending downwardly from a top wall of the cover;
   wherein a bottom of the cover is open; wherein the bottom of the cover insertably receives a golf cart therein;
   wherein a user is able to see thru the cover as said cover is made of a translucent material; wherein the cover is made of a fluid impermeable material;
   wherein the top wall of the cover is configured to abut a roof on the golf cart when the cover is positioned over the golf cart;
   wherein the cover is further defined with a front side of the outer wall; wherein said front side has a height that is less than a height of each of a first and a second lateral side of the cover;
   wherein a lower edge of the front side of the outer wall of the cover is configured to abut a hood of the golf cart when the cover is positioned over the golf cart;
   wherein the first cut is centrally positioned on each of the first and second lateral sides of the outer wall of the cover; wherein the first and second lateral sides of the cover each has a second cut extending forwardly from a top end of the first cut; wherein the first and second cuts forms a door on each of the first and second lateral sides of the outer wall of the cover.

2. The assembly according to claim 1 wherein each of the first and second lateral sides of the outer wall of the cover has a first cut extending upwardly from a bottom edge of each of the first and second lateral sides of the outer wall of the cover.

3. The assembly according to claim 1 wherein the first cut on each of the first and second lateral sides of the outer wall of the cover overlaps the first and second lateral sides of the outer wall of the cover.

4. The assembly according to claim 3 wherein a plurality of couplers is coupled to an inside surface of the first and second lateral sides of the outer wall of the cover; wherein the plurality of couplers are positioned proximate the first cut on an associated one of the first and second lateral sides of the outer wall of the cover; wherein each of the plurality of couplers engages the first and second lateral sides of the outer wall of the cover; wherein the door on each of the first and second lateral sides of the outer wall of the cover is retained in a closed position.

5. The assembly according to claim 4 wherein a plurality of straps is each positioned at an intersection of the front side and each of the first and second lateral sides of the outer wall of the cover; wherein the plurality of straps is additionally positioned at an intersection of a back edge and each of the first and second lateral sides of the outer wall of the cover; wherein each of the plurality of straps is configured to be tied to a bottom of the golf cart.

6. The assembly according to claim 5 wherein the back edge of the outer wall of the cover is open.

7. The assembly according to claim 6 wherein the cover includes a back member that extends downwardly from a top, rear edge of the top wall; wherein the back member is adapted to rest against a club storage area on a back of the golf cart; wherein the back member hangs freely from the top, rear edge of the top wall so as to provide access to the club storage area.

8. The assembly according to claim 7 wherein the back member extends downwardly from the top, rear edge to a back, bottom edge, which surpasses the club storage area of the back of the golf cart.

9. A removable cab assembly configured to be positioned on a golf cart comprising:
   a cover configured to be positioned on the golf cart such that said cover encloses a pair of seats on the golf cart;
   wherein the cover is positionable over the golf cart when the golf cart is exposed to precipitation so a user is protected from the precipitation;
   a plurality of straps coupled to said cover;
   wherein the cover has an outer wall extending downwardly from a top wall of the cover;
   wherein a bottom of the cover is open; wherein the bottom of the cover insertably receives a golf cart therein;
   wherein a user is able to see thru the cover as said cover is made of a translucent material; wherein the cover is made of a fluid impermeable material;
   wherein the top wall of the cover is configured to abut a roof on the golf cart when the cover is positioned over the golf cart; wherein the cover is further defined with a front side of the outer wall; wherein said front side has a height that is less than a height of each of a first and a second lateral side of the cover; wherein a lower edge of the front side of the outer wall of the cover is configured to abut a hood of the golf cart when the cover is positioned over the golf cart;

wherein each of the first and second lateral sides of the outer wall of the cover has a first cut extending upwardly from a bottom edge of each of the first and second lateral sides of the outer wall of the cover;

wherein the first cut is centrally positioned on each of the first and second lateral sides of the outer wall of the cover; wherein the first and second lateral sides of the cover each has a second cut extending forwardly from a top end of the first cut; wherein the first and second cuts forms a door on each of the first and second lateral sides of the outer wall of the cover; wherein the first cut on each of the first and second lateral sides of the outer wall of the cover overlaps the first and second lateral sides of the outer wall of the cover.

10. The assembly according to claim 9 wherein a plurality of couplers is coupled to an inside surface of the first and second lateral sides of the outer wall of the cover; wherein the plurality of couplers are positioned proximate the first cut on an associated one of the first and second lateral sides of the outer wall of the cover; wherein each of the plurality of couplers engages the first and second lateral sides of the outer wall of the cover; wherein the door on each of the first and second lateral sides of the outer wall of the cover is retained in a closed position; wherein a plurality of straps is each positioned at an intersection of the front side and each of the first and second lateral sides of the outer wall of the cover; wherein the plurality of straps is additionally positioned at an intersection of a back edge and each of the first and second lateral sides of the outer wall of the cover; wherein each of the plurality of straps is configured to be tied to a bottom of the golf cart; wherein the back edge of the outer wall of the cover is open.

11. The assembly according to claim 10 wherein the cover includes a back member that extends downwardly from a top, rear edge of the top wall; wherein the back member is adapted to rest against a club storage area on a back of the golf cart; wherein the back member hangs freely from the top, rear edge of the top wall so as to provide access to the club storage area; wherein the back member extends downwardly from the top, rear edge to a back, bottom edge, which surpasses the club storage area of the back of the golf cart.

\* \* \* \* \*